United States Patent
Meyer Zu Berstenhorst et al.

(10) Patent No.: US 8,697,227 B2
(45) Date of Patent: Apr. 15, 2014

(54) WEATHER-RESISTANT MULTILAYER SYSTEMS

(75) Inventors: Birgit Meyer Zu Berstenhorst, Leverkusen (DE); Gunther Stollwerck, Krefeld (DE); Frank Buckel, Kempen (DE); Heinz Pudleiner, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 43 days.

(21) Appl. No.: 13/319,582

(22) PCT Filed: May 4, 2010

(86) PCT No.: PCT/EP2010/002701
§ 371 (c)(1),
(2), (4) Date: Dec. 20, 2011

(87) PCT Pub. No.: WO2010/130350
PCT Pub. Date: Nov. 18, 2010

(65) Prior Publication Data
US 2012/0099187 A1    Apr. 26, 2012

(30) Foreign Application Priority Data

May 12, 2009 (DE) .......... 10 2009 020 938

(51) Int. Cl.
| | |
|---|---|
| B32B 7/02 | (2006.01) |
| B32B 9/04 | (2006.01) |
| B32B 27/36 | (2006.01) |
| B32B 27/00 | (2006.01) |
| B29C 65/00 | (2006.01) |
| B29C 47/00 | (2006.01) |

(52) U.S. Cl.
USPC ........ 428/212; 428/411.1; 428/412; 428/500; 156/60; 156/244.11; 156/245

(58) Field of Classification Search
None
See application file for complete search history.

(56) References Cited

U.S. PATENT DOCUMENTS

| | | |
|---|---|---|
| 4,101,513 A | 7/1978 | Fox et al. |
| 5,001,177 A | 3/1991 | Winfried et al. |
| 5,108,835 A | 4/1992 | Hahnsen et al. |
| 5,288,778 A | 2/1994 | Schmitter et al. |
| 5,391,795 A | 2/1995 | Pickett |
| 5,679,820 A | 10/1997 | Pickett et al. |
| 6,060,543 A | 5/2000 | Bolle et al. |
| 6,225,384 B1 | 5/2001 | Renz et al. |
| 6,255,483 B1 | 7/2001 | Fletcher et al. |
| 2002/0083641 A1 | 7/2002 | Leppard et al. |
| 2004/0013882 A1 | 1/2004 | Gorny et al. |
| 2005/0084663 A1 | 4/2005 | Gorny et al. |
| 2006/0234061 A1 | 10/2006 | Buckel et al. |
| 2007/0104956 A1 | 5/2007 | Grandhee |
| 2008/0217577 A1 | 9/2008 | Hayes |
| 2009/0130489 A1* | 5/2009 | Stollwerck et al. ........... 428/704 |

FOREIGN PATENT DOCUMENTS

| | | |
|---|---|---|
| DE | 2804283 A1 | 8/1978 |
| DE | 4 238 123 A1 | 5/1994 |
| DE | 197 39 797 A1 | 3/1998 |
| EP | 0110221 A2 | 6/1984 |
| EP | 0 247 480 A2 | 12/1987 |
| EP | 0 320 632 A2 | 6/1989 |
| EP | 0339257 A2 | 11/1989 |
| EP | 0 500 496 A1 | 8/1992 |
| EP | 0 570 165 A2 | 11/1993 |
| EP | 1308084 A1 | 5/2003 |
| EP | 1380416 A2 | 1/2004 |
| FR | 2812299 A1 | 2/2002 |
| WO | WO-96/28431 A1 | 9/1996 |
| WO | WO-00/66675 A1 | 11/2000 |
| WO | WO-03/049940 A1 | 6/2003 |
| WO | WO-2006/108520 A1 | 10/2006 |
| WO | WO-2006/121484 A1 | 11/2006 |
| WO | WO-2008/071363 A2 | 6/2008 |
| WO | WO-2008/109072 A1 | 9/2008 |
| WO | WO-2009/049904 A1 | 4/2009 |

* cited by examiner

Primary Examiner — Sheeba Ahmed
(74) Attorney, Agent, or Firm — Novak Druce Connolly Bove + Quigg LLP

(57) ABSTRACT

The invention relates to a multilayer product comprising a first layer (A), a second layer (B), a third layer (C), and a fourth layer (D). The first layer (A) is a scratch-resistant protective layer having a minimum extinction of 0.3 at 340 nm, the second layer (B) is an alkyl acrylate layer having a minimum extinction of 2 at 340 nm, and the third layer (C) and the fourth layer (D) contain a UV-stabilized polycarbonate. The invention also relates to a method for manufacturing the multilayer product.

9 Claims, No Drawings

WEATHER-RESISTANT MULTILAYER SYSTEMS

CROSS-REFERENCE TO RELATED APPLICATIONS

This application is a national stage application (under 35 U.S.C. §371) of PCT/EP2010/002701, filed May 4, 2010, which claims benefit of German application 10 2009 020 938.7, filed May 12, 2009, both of which are incorporated herein by reference in their entirety for all their useful purposes.

BACKGROUND

The present invention relates to a multilayer product comprising four layers, the second and third layers being a layer composite consisting of a thermoplastic and a UV-stabilised polycarbonate, the second layer being a UV protection layer based on alkyl acrylate and the first layer being a scratch protection layer, which likewise contains UV absorber, the first and second layers having particular extinction values and the fourth layer likewise consisting of polycarbonate. The invention furthermore relates to the manufacture of these multilayer products and to products, for example glazing, which contain the said multilayer products.

Shaped bodies made of polycarbonate have already been known for a long time. Polycarbonate, however, has the disadvantage that it is not per se inherently UV-stable. The sensitivity curve of bisphenol A polycarbonate has the highest sensitivity between 320 nm and 330 nm. Below 300 nm no solar radiation reaches the Earth, and above 350 nm this polycarbonate is so insensitive that yellowing no longer takes place.

In order to protect polycarbonate against the harmful effect of UV rays in the atmosphere, UV stabilisers are generally used which absorb the UV radiation and convert it into non-harmful heat energy.

For durable protection, it is advantageous for the harmful UV radiation to be filtered out effectively before it reaches the polycarbonate surface, as may be done by using UV protection layers, for example coextrusion layers containing UV absorber, films containing UV absorber or coating compositions containing UV absorber, on polycarbonate.

Typical UV absorber classes, which are known to be usable for this, are 2-hydroxybenzophenones, 2-(2-hydroxyphenyl) benzotriazoles, 2-(2-hydroxyphenyl)-1,3,5-triazines, 2-cyanoacrylates and oxalanilides.

The prior art of multilayer products will be summarised below by way of example.

EP-A 0 110 221 discloses plates consisting of two polycarbonate layers, one layer containing at least 3 wt. % of a UV absorber. According to EP-A 0 110 221, these plates may be manufactured by coextrusion.

EP-A 0 320 632 discloses shaped bodies consisting of two layers of thermoplastic, preferably polycarbonate, one layer containing specially substituted benzotriazoles as UV absorbers. EP-A 0 320 632 also discloses the manufacture of these shaped bodies by coextrusion.

EP-A 0 247 480 discloses multilayer plates which contain a layer of branched polycarbonate in addition to a layer of thermoplastic, the polycarbonate layer containing specially substituted benzotriazoles as UV absorbers. The manufacture of these plates by coextrusion is likewise disclosed.

EP-A 0 500 496 discloses polymer compositions which are stabilised against UV light by special triazines, and their use as an outer layer in multilayer systems. Polycarbonate, polyester, polyamides, polyacetals, polyphenylene oxide and polyphenylene sulfide are mentioned as polymers.

US 2006/0234061 A1 discloses a multilayer product comprising a first layer and a second layer, the second layer containing polycarbonate and the first layer being a UV protection layer based on alkyl acrylate, which contains a diphenyl-substituted triazine as UV stabiliser.

WO 2006/121484 A2 discloses a plastic plate consisting of a polymer layer, a weather-resistant film layer and an abrasion protection layer, and the production of the overall composite. Polycarbonate, polymethyl methacrylate, polyester, polycarbonate/acrylonitrile butadiene styrene blend and polycarbonate/polyester blend are mentioned as polymers.

It has, however, been found that the known UV-stabilised polycarbonate shaped bodies still have insufficient long-term stability against yellowing for many applications, in particular for outdoor applications with constantly high requirements in relation to visual impression, for example glazing. The number of coating steps should furthermore be kept as small as possible, since they are expensive and susceptible to defects.

For such applications, it is required that a polycarbonate shaped body does not yellow by more than Δ YI 3 under 30 MJ/m² of irradiation at 340 nm (corresponding to 10 years of outdoor weathering in Florida).

The weathering for this test is carried out in an Atlas Ci 5000 weatherometer with an irradiance of 0.75 W/m²/nm at 340 nm and a dry/rain cycle of 102:18 minutes. The black panel temperature is 70° C., the sample room temperature 55° C. and the relative humidity 40%.

It is an object of the present invention to provide polycarbonate shaped bodies which yellow as little as possible under the said weathering conditions (YI or ΔYI as low as possible). As few coating steps as possible should furthermore be required for reasons of processing time reduction and the susceptibility to coating defects.

DESCRIPTION OF PREFERRED EMBODIMENTS

This object is surprisingly achieved by a multilayer product comprising a first layer (A), a second layer (B), a third layer (C), and a fourth layer (D), wherein the first layer (A) is a scratch-resistant protective layer which has an extinction of at least 0.3 at 340 nm, the second layer (B) is an alkyl acrylate layer having an extinction of at least 2, preferably >2.5, at 340 nm, and the third layer (C) and the fourth layer (D) contain a UV-stabilised polycarbonate.

Here, the second and third layers (B and C) are in the form of a coextruded film or two laminated films or a polycarbonate film (C) coated with (B), which are back injection moulded with layer (D) in the subsequent step, preferably by film injection moulding (FIM), and subsequently provided with layer (A). Suitable methods for application on layer (A) are for example flow coating, dip coating, spraying, rolling or spin coating (cf. description). In the case of using a coextruded film or a laminated film, only one coating step is therefore necessary.

The present invention also provides a method for manufacturing a multilayer product comprising a first layer (A), a second layer (B), a third layer (C), and a fourth layer (D), wherein the first layer (A) is a scratch-resistant protective layer which has an extinction of at least 0.3 at 340 nm, the second layer (B) is an alkyl acrylate layer having an extinction of at least 2, preferably >2.5, at 340 nm, and the third layer (C) and the fourth layer (D) contain a UV-stabilised polycarbonate, characterised in that the second and third layers (B and C) in the form of a coextruded film, two laminated films or a polycarbonate film coated with the layer (B), are back injection moulded, preferably by means of film injection moulding, and subsequently provided with layer (A), for example by flow coating, dip coating, spraying, rolling or spin coating.

Additional layers (E) and (F) may be applied, (E) being applied before layer (A) and then (A) and (F) being applied for example by flow coating, dip coating, spraying, rolling or spin coating, and preferably thermally cured.

The invention is surprising in that the UV protection, which is provided by the scratch-resistant layer (A) and the UV protection layer (B), should in principle be sufficient so that damage to the polycarbonate, which leads to yellowing, is virtually precluded. In this regard, the literature describes a possible way of calculating the YI (yellowness index): the wavelength-dependent yellowing of the material is first determined by the spectral sensitivity method (Interpretation of the spectral sensitivity and of the action spectrum of polymers, P. Trubiroha, Proceedings of XXII. Donauländergespräche, 17.8.2001, Berlin, page 4-1). The spectral distribution of the UV light of the Sun behind the UV protection layer is then calculated. The yellowing after weathering can be calculated in a known way from the two sets of data by convolution and integration as a function of time. (Grundsätzliches zur Lebensdauervorhersage in der Bewitterung [Fundamentals of lifetime prediction in weathering], A. Geburtig, V. Wachtendorf, Proceedings of the 34$^{th}$ Annual Meeting of the Gesellschaft für Umweltsimulation, Umwelteinflüsse erfassen, simulieren und bewerten [Detecting, simulating and evaluating environmental effects], 2.3. 2005, Pfinztal, page 159).

The present invention relates to this multilayer product.

The multilayer product according to the invention may comprise further layers, in particular a further UV protection layer (E), which is likewise an alkyl acrylate layer that contains a UV stabiliser and may be in the form of a film or a cured coating composition. The layer sequence is in this case (A)-(B)-(C)-(D)-(E). A further scratch protection layer (F) may furthermore be applied on (E), in which case (A) and (F) may contain the same composition or different compositions. The layer sequence is in this case (A)-(B)-(C)-(D)-(E)-(F). Instead of (E) and (F), it is also possible to apply a single UV-stabilised scratch protection layer (G). The layer sequence is in this case (A)-(B)-(C)-(D)-(G). Layer (E) or (G) may contain the UV absorbers mentioned in the present application.

The UV absorber used in the layers (A) and optionally (F) of the multilayer product according to the invention has the general Formula (I):

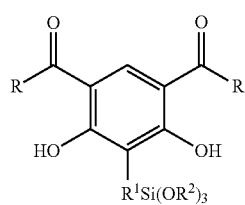

(I)

where R optionally represents a substituted or unsubstituted monocyclic or polycyclic aromatic residue, $R^1$ a branched or unbranched $C_1$-$C_{10}$ alkyl and $R^2$ a branched or unbranched $C_1$-$C_6$ alkyl. 4,6-Dibenzoyl-2-(3-trialkoxysilylalklyl) resorcinol is preferably used, and 4,6-dibenzoyl-2-(3-triethoxysilylpropyl)resorcinol (CAS No. 166255-23-8) is particularly preferably used. Such silylated benzophenone UV absorbers of general Formula (1) are known in principle from U.S. Pat. No. 5,391,795, U.S. Pat. No. 5,679,820 and EP 0339257.

The UV absorbers used in the layers (B) and optionally (E) of the multilayer product according to the invention may be selected from the group of UV absorbers which are stable in acrylates and exhibit absorption, and therefore protect polycarbonate, in the range around 320-350 nm. As is known, benzotriazines and triazoles are particularly suitable since they exhibit high extinction coefficients and low degradation in acrylates (in comparison with, for example, benzophenone derivatives).

Triazoles of general Formula (II) are preferably used):

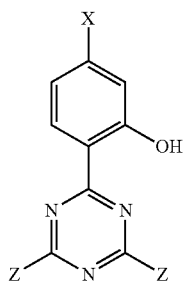

(II)

where

X denotes $OR^1$; $OCH_2CH_2OR^1$; $OCH_2CH(OH)CH_2OR^1$ or $OCH(R^2)COOR^3$, in which $R^1$ respectively stands for $C_1$-$C_{13}$ alkyl, $C_2$-$C_{20}$ alkenyl, $C_6$-$C_{12}$ aryl or —CO—$C_1$-$C_{18}$ alkyl, $R^2$ is H or $C_1$-$C_8$ alkyl, and $R^3$ denotes $C_1$-$C_{12}$ alkyl; $C_2$-$C_{12}$ alkenyl or $C_5$-$C_6$ cycloalkyl and Z independently of one another respectively denote an unsubstituted phenyl or diphenyl, or a phenyl or diphenyl singly or multiply substituted with $C_1$-$C_6$ alkyl, preferably methyl and/or ethyl; preferably phenyl, methylphenyl, dimethylphenyl, trimethylphenyl or diphenyl.

The hydrocarbon chains of, for example, alkyl or alkenyl may respectively be branched or unbranched.

For UV protection layers (B) or (E) in the form of films or coextrusion layers, X is preferably $OR^1$; particularly preferably with $R^1$=$CH_2CH(CH_2CH_3)C_4H_9$ and Z=diphenyl.

For UV protection layers (E) in the form of cured coating formulations, X is preferably $OCH(R^2)COOR^3$; particularly preferably with $R^2$=$CH_3$, $R^3$=$C_8H_{17}$ and Z=diphenyl.

Such diphenyl-substituted triazines of general Formula II are known in principle from WO 96/28431; DE-A 197 39 797; WO 00/66675; U.S. Pat. No. 6,225,384; U.S. Pat. No. 6,255,483; EP-A 1 308 084 and FR 2812299.

UV protection layers (B) or (E) according to the invention in the form of films or coextrusion layers contain, as a polymer matrix, a polyacrylate containing alkyl methacrylate as a monomer component, preferably having from 1 to 10 carbon atoms in the alkyl, methyl methacrylate being particularly preferred. Polymethyl methacrylate is preferred in particular.

In the present application, the terms alkyl acrylate and polyalkyl acrylate are synonymous for polyacrylate as it is defined above. PMMA denotes polymethyl methacrylate.

Since a particular minimum extinction of the UV protection layer is required for long-term UV protection, the required UV absorber concentration depends on the layer thickness.

The scratch-resistant layers (A) or (F) according to the invention are based on sol-gel siloxane coating compositions and, with layer thicknesses of from 1 to 20 μm, preferably from 2 to 15 μm, particularly preferably from 4 to 12 μm, have an extinction of between 0.2 and 4, preferably from 0.2 to 2, particularly preferably 0.3≤extinction (scratch-resistant layer)≤1, and contain a UV absorber of Formula (1).

The UV protection layers (B) or (E) according to the invention consisting of coextrusion layers contain, with layer thicknesses from 1 to 500 μm, preferably from 1 to 100 μm, particularly preferably from 2 to 50 μm, from 0.05 to 20 wt. %, preferably from 0.1 to 15 wt. %, particularly preferably from 0.5 to 10 wt. % of UV absorber of Formula (II), coextrusion layers having a layer thickness of 2 μm containing at least 10 wt. %, preferably ≥15 wt. %, those of 10 μm at least 2 wt. %, preferably ≥3 wt. % and those of 30 μm at least 0.7 wt. %, preferably ≥1 wt. %. For the extinction of the UV protection layers (B), the following applies (respectively with a wavelength of 340 nm):

1≤extinction (UV protection layer)≤10, preferably 2≤extinction (UV protection layer)≤9, particularly preferably 3≤extinction (UV protection layer)≤8.

The UV protection layers (B) or (E) according to the invention consisting of cured coating formulations contain, with layer thicknesses from 1 to 100 μm, preferably from 1 to 30 μm, particularly preferably from 1 to 10 μm, from 0.5 to 20 wt. %, preferably from 1 to 15 wt. %, particularly preferably from 1.5 to 10 wt. % of UV absorber of Formula (I) expressed in terms of the solids content of the coating formulation, formulations having layer thicknesses of 1 μm after application and curing containing at least 10 wt. %, preferably ≥15 wt. %, those of 5 μm at least 2 wt. %, preferably ≥3 wt. % and those of 10 μm at least 1 wt. %, preferably ≥1.5 wt. %.

The UV protection layers according to the invention consisting of films contain, with layer thicknesses of from 2 μm to 2 mm, preferably from 50 μm 1 mm, particularly preferably from 80 μm to 500 μm, from 0.01 to 20 wt. %, preferably from 0.02 to 5 wt. %, particularly preferably from 0.04 to 2 wt. % of UV absorber of Formula (I), films having a layer thickness of 80 μm containing at least 0.25 wt. %, preferably ≥0.4 wt. %, those of 200 μm containing at least 0.1 wt. %, preferably ≥0.15 wt. % and those of 500 μm containing at least 0.04 wt. %, preferably ≥0.06 wt. %.

The layer (G) according to the invention is a UV-stabilised scratch protection layer, particularly preferably a hybrid coating composition. Suitable methods for application on layer (A) are for example flow coating, dip coating, spraying, rolling or spin coating.

The curing may be carried out both thermally and by UV radiation. A possible thermally curable hybrid coating composition is PHC587 (Momentive Performance Materials), cf. EP-A 0 570 165.

Examples of UV-curable hybrid coating compositions are UV-curable acrylate coating compositions or UV-curable water-free hydrolysable silane systems, as described in WO 2008/071363 A or DE-A 2804283. UVHC3000 (Momentive Performance Materials) is one commercially available system.

All known polycarbonates are suitable polycarbonates for the third and fourth layers (C) and (D) of the multilayer products according to the invention, and these may be homopolycarbonates, copolycarbonates and thermoplastic polyester carbonates.

They preferably have average molecular weights $\overline{M}_w$ of from 18,000 to 40,000, preferably from 22,000 to 36,000 and in particular from 24,000 to 33,000, determined by measuring the relative solution viscosity in dichloromethane or in mixtures of equal amounts of phenol/o-dichlorobenzene by weight calibrated by light scattering.

In this the third case layer (C) must likewise contain UV absorber, whereas (D) may be, but does not have to be, UV-stabilised. All conventional UV absorbers for polycarbonate may be selected as a UV absorber, for example Tinuvin® 234 (2-[2-hydroxy-3,5-bis(α,α-dimethylbenzyl)phenyl]benzotriazole, CAS No. 70321-86-7), Tinuvin® 326 (2-(2-hydroxy-3-tert-butyl-5-methylphenyl)-5-chlorobenzotriazole, CAS No. 3896-11-5), Tinuvin® 329 (2-(2-hydroxy-5-tert-octylphenyl)benzotriazole, CAS No. 3147-75-9), Tinuvin® 350(2-(2H-benzotriazol-2-yl)-4-(1,1-dimethylethyl)-6-(2-methylpropyl)phenol, CAS No. 134440-54-3), Tinuvin® 360 (2,2'-methylenebis(6-(2H-benzotriazol-2-yl)-4-(1,1,3,3-tetramethylbutyl)phenol), CAS No. 103597-45-1) or Tinuvin® 1577 (2,4-diphenyl-6-(2-hydroxy-4-hexyloxyphenyl)-s-triazine, CAS No. 147315-50-2) from Ciba Speciality Chemicals. The UV-protected polycarbonate layers contain from 0.1 to 3 wt. %, preferably from 0.1 to 1.5 wt. %, particularly preferably from 0.2 to 0.5 wt. % of UV absorber.

With respect to the production of polycarbonates, reference may be made for example to "Schnell, Chemistry and Physics of Polycarbonates, Polymer Reviews, Vol. 9, Interscience Publishers, New York, London, Sydney 1964", to "D. C. PREVORSEK, B. T. DEBONA and Y. KESTEN, Corporate Research Center, Allied Chemical Corporation, Morristown, N.J. 07960, 'Synthesis of Poly(ester)carbonate Copolymers' in Journal of Polymer Science, Polymer Chemistry Edition, Vol. 19, 75-90 (1980)", to "D. Freitag, U. Grigo, P. R. Müller, N. Nouvertne, BAYER AG, 'Polycarbonates' in Encyclopedia of Polymer Science and Engineering, Vol. 11, Second Edition, 1988, pages 648-718" and lastly to "Dres. U. Grigo, K. Kircher and P. R. Müller 'Polycarbonate' [Polycarbonates] in Becker/Braun, Kunststoff-Handbuch [Plastics handbook], volume 3/1, Polycarbonate, Polyacetale, Polyester, Celluloseester [Polycarbonates, polyacetals, polyesters, cellulose esters], Carl Hanser Verlag Munich, Vienna 1992, pages 117-299".

The polycarbonates are preferably produced by the phase interface method or the melt transesterification method, and will be described below with reference to the phase interface method by way of example.

Compounds preferably used as starting compounds are bisphenols of the general formula:

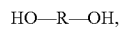

wherein R is a divalent organic residue having from 6 to 30 carbon atoms, which contains one or more aromatic groups.

Examples of such compounds are bisphenols which belong to the group consisting of dihydroxydiphenyls, bis(hydroxyphenyl)alkanes, indane bisphenols, bis(hydroxy-phenyl) ethers, bis(hydroxyphenyl) sulfones, bis(hydroxyphenyl) ketones and α,α'-bis(hydroxyphenyl)diisopropylbenzenes.

Particularly preferred bisphenols which belong to the aforementioned compound groups are bisphenol A, tetraalkylbisphenol A, 4,4-(meta-phenylenediisopropyl)-diphenol (bisphenol M), 4,4-(para-phenylenediisopropyl)diphenol, 1,1-bis-(4-hydroxy-phenyl)-3,3,5-trimethylcyclohexane (BP-TMC) and optionally mixtures thereof.

The bisphenol compounds to be used according to the invention are preferably reacted with carbonic acid compounds, in particular phosgene, or in the melt transesterification process with diphenyl carbonate or dimethyl carbonate.

Polyester carbonates are preferably obtained by reacting the aforementioned bisphenols, at least one aromatic dicarboxylic acid and optionally carbonic acid equivalents. Suitable aromatic dicarboxylic acids are for example phthalic acid, terephthalic acid, isophthalic acid, 3,3'- or 4,4'-diphenyldicarboxylic acid and benzophenone dicarboxylic acids. A fraction of up to 80 mol. %, preferably from 20 to 50 mol. % of the carbonate groups in the polycarbonates may be replaced by aromatic dicarboxylate groups.

Inert organic solvents used in the phase interface method are for example dichloromethane, the various dichloroethanes and chloropropane compounds, tetrachloromethane, trichloromethane, chlorobenzene and chlorotoluene; chlorobenzene or dichloromethane or mixtures of dichloromethane and chlorobenzene are preferably used.

The phase interface reaction may be accelerated by catalysts such as tertiary amines, in particular N-alkylpiperidines or onium salts. Tributylamine, triethylamine and N-ethylpiperidine are preferably used. In the case of the melt transesterification process, the catalysts mentioned in DE-A 4 238 123 are preferably used.

The polycarbonates can be branched in a deliberate and controlled way by using small amounts of branching agents. Some suitable branching agents are: phloroglucinol, 4,6-dimethyl-2,4,6-tri-(4-hydroxyphenyl)-heptene-2; 4,6-dimethyl-2,4,6-tri-(4-hydroxy-phenyl)heptane; 1,3,5-tri-(4-hydroxyphenyl)benzene; 1,1,1-tri-(4-hydroxyphenyl)-ethane; tri-(4-hydroxyphenyl)phenylmethane; 2,2-bis-[4,4-bis-(4-hydroxyphenyl)-cyclohexyl]propane; 2,4-bis-(4-hydroxyphenyl-isopropyl)phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl) orthoterephthalate; tetra-(4-hydroxyphenyl)methane; tetra-(4-(4-hydroxyphenyl-isopropyl)-phenoxy)methane; $\alpha,\alpha'$, $\alpha''$-tris-(4-hydroxyphenyl)-1,3,5-triisopropylbenzene; 2,4-dihydroxybenzoate; trimesic acid; cyanuric chloride; 3,3-bis-(3-methyl-4-hydroxyphenyl)-2-oxo-2,3-dihydroindole; 1,4-bis-(4',4''-dihydroxytriphenyl)-methyl)benzene and, in particular: 1,1,1-tri-(4-hydroxyphenyl)ethane and bis-(3-methyl-4-hydroxyphenyl)-2-oxo-2,3-dihydroindole.

The 0.05 to 2 mol. % of branching agents or mixtures of branching agents optionally also to be used, expressed in terms of the diphenols used, may be used together with the diphenols or, alternatively, added at a later stage in the synthesis.

As chain terminators, it is preferable to use phenols such as phenol, alkylphenols such as cresol and 4-tert.-butylphenol, chlorophenol, bromophenol, cumylphenol or mixtures thereof in amounts of 1-20 mol. %, preferably 2-10 mol. % per mole of bisphenol. Phenol, 4-tert.-butylphenol or cumylphenol are preferred.

Chain terminators and branching agents may be added separately to the syntheses, or alternatively together with the bisphenol.

Production of the polycarbonates by the melt transesterification process is described, for example, in DE-A 4 238 123.

Polycarbonates preferred according to the invention for the second layer of the multilayer product according to the invention are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

The homopolycarbonate based on bisphenol A is particularly preferred.

The polycarbonate may contain stabilisers. Suitable stabilisers are for example phosphines, phosphites or stabilisers containing Si, and other compounds described in EP-A 0 500 496. Triphenylphosphites, diphenylalkylphosphites, phenyldialkyl-phosphites, tris-(nonylphenyl) phosphite, tetrakis-(2,4-di-tert.-butylphenyl)-4,4'-diphenylene diphosponite and triarylphosphite may be mentioned by way of example. Triphenylphosphine and tris-(2,4-di-tert.-butylphenyl)phosphite are particularly preferred.

The second layer (B) of the multilayer product according to the invention, containing the polycarbonate, may furthermore contain from 0.01 to 0.5 wt. % of the esters or semiesters of mono- to hexavalent alcohols, in particular of glycerol, pentaerythritol or Guerbet alcohols.

Examples of monovalent alcohols are stearyl alcohol, palmityl alcohol and Guerbet alcohols.

An example of a divalent alcohol is glycol.

An example of a trivalent alcohol is gylcerol.

Examples of tetravalent alcohols are pentaerythritol and mesoerythritol.

Examples of pentavalent alcohols are arabitol, ribitol and xylitol.

Examples of hexavalent alcohols are mannitol, glucitol (sorbitol) and dulcitol.

The esters are preferably the monoesters, diesters, triesters, tetraesters, pentaesters and hexaesters, or mixtures thereof, in particular statistical mixtures, of saturated aliphatic $C_{10}$ to $C_{36}$ monocarboxylic acids and optionally hydroxy-monocarboxylic acids, preferably with saturated aliphatic $C_{14}$ to $C_{32}$ monocarboxylic acids and optionally hydroxy-monocarboxylic acids.

The commercially available fatty acid esters, in particular of pentaerythritol and glycerol, may contain <60% of various semiesters owing to production.

Examples of saturated aliphatic monocarboxylic acids having from 10 to 36 C atoms are capric acid, lauric acid, myristic acid, palmitic acid, stearic acid, hydroxystearic acid, arachidic acid, behenic acid, lignoceric acid, cerotic acid and montanic acid.

Examples of preferred saturated aliphatic monocarboxylic acids having from 14 to 22 C atoms are myristic acid, palmitic acid, stearic acid, hydroxystearic acid, arachidic acid and behenic acid.

Saturated aliphatic monocarboxylic acids such as palmitic acid, stearic acid and hydroxystearic acid are particularly preferred.

The saturated aliphatic $C_{10}$ to $C_{36}$ carboxylic acids and the fatty acid esters per se are either known from the literature or can be produced by methods known from the literature. Examples of pentaerythritol fatty acid esters are those of the particularly preferred monocarboxylic acids mentioned above.

Esters of pentaerythritol and of glycerol with stearic acid and palmitic acid are particularly preferred.

Esters of Guerbet alcohols and of glycerol with stearic acid and palmitic acid, and optionally hydroxystearic acid, are also particularly preferred.

The multilayer product according to the invention may contain organic dyes, inorganic colour pigments, fluorescent dyes, IR absorbers and particularly preferably optical brighteners.

The multilayer system according to the invention is produced as follows: a compound (a) consisting of (a1) a polyacrylate and (a2) a UV absorber, particularly preferably a diphenyl-substituted triazine of general Formula (II), is coextruded with UV-protected polycarbonate in such a way that a thin UV protection layer of compound (a), which has an extinction of at least 2.5, adheres well on the polycarbonate surface. The coex film is then back injection moulded or laminated with polycarbonate on the polycarbonate side to form a firmly adhering composite. Lastly, the scratch-resistant layer (A), which likewise contains a UV absorber, is applied by means of flow coating, dip coating, spraying, rolling or spin coating onto the surface of the polycarbonate shaped part, onto the UV protection layer (B), and subsequently physically dried so that a firmly adhering coating is obtained on the alkyl acrylate layer. The extinction of this layer (A) should be at least 0.3.

Optionally, before application of the scratch protection layer (A), a further UV protection layer (E) is first applied on the polycarbonate side of the polycarbonate shaped part, this UV protection layer (E) consisting of (b2) a diphenyl-substituted triazine of general Formula (II) in a coating formulation (b) containing (b1) a polyacrylic resin containing methyl methacrylate as a main monomer component, and optionally a further alkyl methacrylate with a longer linear or branched alkyl chain ($—C_nH_{2n+1}$ with n>1), preferably $1 \leq n \leq 10$, particularly preferably linear with n=3 (butyl methacrylate), one or more solvents and optionally further coating additives such as for example fillers, leveling agents, radical scavengers etc. This coating formulation (b) is applied by means of flow coating, dip coating, spraying, rolling or spin coating onto the surface of a polycarbonate shaped part, and subsequently physically dried so that a firmly adhering coating on PC is obtained. Lastly application of the scratch protection layer (A) is carried out, which is now applied on both sides of the shaped part in the manner described above.

The ratio of the two methacrylate monomer units is preferably from 75 to 100% of methyl methacrylate/25 to 0% of alkyl methacrylate, preferably from 85 to 100% of methyl methacrylate/15 to 0% of alkyl methacrylate, particularly preferably from 90 to 100% of methyl methacrylate and from 10 to 0% of alkyl methacrylate (data in wt. %).

Coating formulations according to (b) and application of the UV protection coating formulation onto the substrates are described for example and preferably in WO 2006/108520 A.

The scratch-resistant layer is applied in the form of a scratch-resistant or abrasion-resistant coating composition, for example but not exclusively a polysiloxane coating composition or sol-gel coating composition, a silicate coating (water glass) or a formulation (hybrid coating composition) containing nanoparticles, by flow coating, dip coating, spraying, rolling or spin coating onto the surface of the UV protection layer and subsequently cured to form a firmly adhering PC/UV protection layer/scratch-resistant layer composite.

Sol-gel coating compositions in the sense of the present invention are coating compositions which are produced by the sol-gel process. The sol-gel process is a method for the synthesis of nonmetallic inorganic or hybrid polymeric materials from colloidal dispersions, so-called sols.

For example, such sol-gel coating solutions can be produced by hydrolysing aqueous dispersions of colloidal silicon dioxide and an organoalkoxysilane or mixtures of organoalkoxysilanes of general Formula $RSi(OR')_3$, where R in the organoalkoxysilane(s) general Formula $RSi(OR')_3$ stands for a monovalent $C_1$ to $C_6$ alkyl residue or for a fully or partially fluorinated $C_1$ to $C_6$ alkyl, for a vinyl or allyl unit, an aryl residue or for a $C_1$-$C_6$ alkoxy group. R is particularly preferably a $C_1$ to $C_4$ alkyl group, a methyl, ethyl, n-propyl, iso-propyl, tert.-butyl, sec.-butyl or n-butyl group, a vinyl, allyl, phenyl or substituted phenyl unit. The —OR' are selected independently of one another from the group containing $C_1$-$C_6$ alkoxy groups, a hydroxyl group, a formyl unit and an acyl unit.

The colloidal silicon dioxide is for example available as e.g. Levasil 200 A (HC Starck), Nalco 1034A (Nalco Chemical Co), Ludox AS-40 or Ludox LS (GRACE Davison). The following compounds may for example be mentioned as organoalkoxysilanes: 3,3,3-trifluoropropyltrimethoxysilane, methyltrimethoxysilane, methyltrihydroxysilane, methyltriethoxysilane, ethyltrimethoxysilane, methyltriacetoxysilane, ethyltriethoxysilane, phenyltrialkoxysilane (for example phenyltriethoxysilane and phenyltrimethoxysilane) and mixtures thereof.

Organic and/or inorganic acids or bases may for example be used as catalysts.

In one embodiment, the colloidal silicon dioxide particles may also be formed in situ by precondensation starting from alkoxysilanes (cf. "The Chemistry of Silica", Ralph K. Iler, John Wiley & Sons, (1979), p. 312-461).

The hydrolysis of the sol-gel solution is terminated or slowed down greatly by adding solvents, preferably alcoholic solvents such as for example isopropanol, n-butanol, isobutanol or mixtures thereof. One or more UV absorbers according to the invention, which are optionally predissolved in a solvent, are subsequently added to the sol-gel coating solution, then a maturing step of a few hours or a few days/weeks takes place. In addition, further additives and/or stabilisers such as leveling agents, surface additives, thickeners, pigments, dyes, curing catalysts, IR absorbers, UV absorbers and/or adhesion promoters may also be added. It is also possible to use hexamethyldisilazane or comparable compounds, which can lead to a reduced susceptibility of the coatings to cracking (cf. also WO 2008/109072 A).

AS4700 from Momentive Performance Materials (a polysiloxane-based top coating composition containing UV absorber) is for example and preferably used as a scratch-resistant coating composition.

Hybrid coating compositions in the sense of the present invention are based on the use of hybrid polymers as binders. Hybrid polymers (hibrida: lat. "offspring of a mixed union") are polymeric materials which combine structural units of different material classes within themselves on the molecular level. Owing to their structure, hybrid polymers can have entirely new combinations of properties. In contrast to composite materials (defined phase boundaries, weak interaction between the phases) and nanocomposites (use of and nanoscale fillers), the structural units of hybrid polymers are interconnected on the molecular level. This is achieved by chemical methods such as for example the sol-gel process, by which inorganic networks can be constructed. Additional organic oligomer/polymer structures can be generated by the use of organically reactive precursors, for example organically modified metal alkoxides. Acrylate coating compositions containing surface-modified nanoparticles, which form an organic/inorganic network, are likewise defined as hybrid coating compositions.

According to the invention, the preferred multilayer products are those selected from the group consisting of plates, films and three-dimensional shaped parts.

The present invention also relates to the use of the said multilayer products, in particular for outdoor applications with constantly high requirements in relation to visual impression, for example glazing.

The invention will be explained further by the following examples, but without being restricted to them. The examples according to the invention merely illustrate preferred embodiments of the present invention.

EXAMPLE 1

Coextruded films having the structure bisphenol A polycarbonate (type: Makrolon 3108 (high-viscosity BPA PC (MFR 6.5 g/10 min according to ISO 1133 at 300° C. with 1.2 kg) without UV stabilisation))/UV protection coex layer of CGX UVA 006 from the company Ciba Specialty Chemicals (diphenyl-substituted triazine of Formula II with X=OCH$_2$CH(CH$_2$CH$_3$)C$_4$H$_9$) in a PMMA matrix of Plexiglas 8H (PMMA with a Mw of 103.5 kg/mol determined by means of GPC calibrated with PS) from the company Rohm GmbH & Co. KG—back injection moulded on the PC side with Makrolon AL2647 (Bayer MaterialScience AG; medium-viscosity bisphenol A polycarbonate, MVR 12.5 cm$^3$/10 min according to ISO 1133 at 300° C. with 1.2 kg, with UV stabilisation, easily demouldable) and coated on the PMMA side with scratch-resistant coating composition AS4700 from Momentive Performance Materials.

Production of the UV Protection Compound:

14.25 kg of Plexiglas 8H predried for 3 h at 100° C. were ground into powder (grain size about 700 μm), mixed with 750 g of the UV absorber CGX UVA 006 (95%, corresponding to 5 wt. %) and processed to form granules on a twin screw extruder (ZSK 32/3) with a rotation speed of 150 min$^{-1}$. The melt temperature was 260° C. and the granules obtained were clear and transparent.

Production of the Coex Film:

For production of the film on one side, the base material Makrolon 3108 was melted after predrying (4 h at 120° C.) on the main extruder (rotation speed 65.7 min$^{-1}$, melt temperature 296° C. and melt pressure 99 bar). From the other side, the coex material consisting of the UV protection compound predried for 3 h at 100° C. (see above) was delivered through a coextruder (rotation speed 10 min$^{-1}$, melt temperature 286° C. and melt pressure 54 bar) and transferred together with the base material through a plate nozzle onto a rolling mechanism. The coex film obtained in this way had a base material thickness of about 175 μm and a coex UV protection layer of about 13 μm.

Production of the Plate Containing Coex Films:

This is back injection moulded on the polycarbonate side with Makrolon AL2647 (Bayer MaterialScience AG; medium-viscosity bisphenol A polycarbonate, MVR 12.5 cm$^3$/10 min according to ISO 1133 at 300° C. with 1.2 kg, with UV stabilisation, easily demouldable).

Application of the Scratch-Resistant Coating Composition:

The scratch protection coating composition AS4700 from the company Momentive Performance Materials was subsequently applied onto the PMMA side of the coextruded film by the flow coating method, deaerated and then cured for 60 min at 120° C. in a circulated air drying cabinet.

The initial extinction of the coex layer at 340 nm was 3.3.

EXAMPLE 2

Comparative example similar to Example 1, but using the scratch protection coating composition SHC5020 from Momentive Performance Materials which does not contain UV protection.

EXAMPLE 3

Comparative example similar to Example 1, but using a UV-protected bisphenol A polycarbonate (type: Makrolon 3108 (high-viscosity BPA PC (MFR 6.5 g/10 min according to ISO 1133 at 300° C. with 1.2 kg) without UV stabilisation) with 0.3% of Tinuvin 360 (2,2'-methylenebis(6-(2H-benzotriazol-2-yl)-4-1,1,3,3-tetramethylbutyl)phenol—CAS No. 103597-45-1)) as the constituent of the coextruded film.

EXAMPLE 4

Comparative example similar to Example 3, but using rear side protection (3.2 mm plate of Makrolon AL2647 (Bayer MaterialScience AG; medium-viscosity bisphenol A polycarbonate, MVR 12.5 cm$^3$/10 min according to ISO 1133 at 300° C. with 1.2 kg, with UV stabilisation, easily demouldable) in the weathering to prevent damage to the rear side by scattered radiation in the weathering apparatus. The rear side protection was removed for the yellowness index measurements.

Table:

|  | Example |  |  |  |
|---|---|---|---|---|
|  | 1 | 2 | 3 | 4 |
| YI (0 h) | 1.07 | 0.7 | 1.22 | 1.20 |
| YI (7000 h) | 4.12 | 8.13 | 3.54 | 2.48 |
| Δ YI | 3.05 | 7.43 | 2.32 | 1.28 |
| Scratch resistant layer | 5.7 μm | 4.8 μm | 5.5 μm | 5.6 μm |
| Extinction of scratch resistant layer | 0.44 | (Contains no UV protection) | 0.43 | 0.43 |
| Layer thickness of PMMA | 13.5 μm | 13.3 μm | 13.2 μm | 13.1 μm |
| Layer thickness of PC (UV protected) | — | — | 157 μm | 157 μm |
| Extinction of film | 4.7 | 4.6 | 5.3 | 5.3 |
| Rear side | unprotected comparison | unprotected comparison | unprotected according to the invention | protected according to the invention |

Extinction Values:

|  | Scratch resistant layer | PMMA (with CGX) | PC (with Tinuvin 360) |
|---|---|---|---|
| Layer thickness at measurement point | 7.5 μm | 8 μm | 230 μm |
| Extinction at measurement point (at 340 nm) | 0.58 | 2.78 | 1.06 |
| Extinction (at 340 nm)/μm | 0.077 | 0.35 | 0.0046 |

The extinction values of the respective layers were determined on quartz for the scratch-resistant layer (A), using a coex film without UV protection in the polycarbonate (C) for the UV protection layer (B), and on a coex film without UV protection in the UV protection layer (B) for the UV-protected polycarbonate layer (C). The transmissions of the samples were measured using a PELambda900 (photometer 0°/diffuse/Method: MM50002). The extinction at 340 nm was subsequently calculated and indicated according to the Lambert-Beer law for the respective layer thicknesses.

Study of the Bonding of the Multilayer System Based on the PC Substrate:

The following adhesion tests were carried out: a.) adhesive tape peel (adhesive tape used 3M Scotch 898) without and with lattice cut (similar to ISO 2409 or ASTM D 3359); b.) adhesive tape peel after 4 h of storage in boiling water; c.) adhesive tape peel after 10 days of storage in warm water at about 65° C. (similar to ISO 2812-2 and ASTM 870-02), and all passed, i.e. no peeling of the coating or a layer of the layer composite took place (score 0 according to ISO 2409 or 5B according to ASTM D 3359).

Study of the Multilayer Composite After 7000 h of Weathering With 0.75 W/m$^2$/nm at 340 nm Weathering was carried out in a Ci 5000 from the company Atlas with an irradiance of 0.75 W/m$^2$/nm at 340 nm in a 102:18 dry/rain cycle. Boro/boro filters were selected (daylight filtering), the black panel temperature was 70(±2)° C. and the sample room temperature was 55(±2)° C. (dry cycle) base on ASTM G 155.

The invention claimed is:

1. A multilayer product comprising a first layer (A), a second layer (B), a third layer (C), and a fourth layer (D), wherein
the first layer (A) comprises a scratch-resistant protective layer which has an extinction of at least 0.2 at 340 nm, and which comprises an UV absorber of Formula (I):

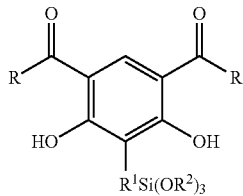

wherein R represents a substituted or unsubstituted monocyclic or polycyclic aromatic residue, $R^1$ represents a branched or unbranched $C_1$-$C_{10}$ alkyl, and $R^2$ represents a branched or unbranched $C_1$-$C_6$ alkyl, and
the second layer (B) comprises an alkyl acrylate layer having an extinction of at least 2 at 340 nm, and which comprises a UV absorber of Formula (II):

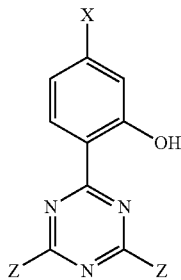

wherein
X represents $OR^1$; $OCH_2CH_2OR^1$; $OCH_2CH(OH)$ $CH_2OR^1$ or $OCH(R^2)COOR^3$, and wherein
$R^1$ respectively represents $C_1$-$C_{13}$ alkyl, $C_2$-$C_{20}$ alkenyl, $C_6$-$C_{12}$ aryl or —CO—$C_1$-$C_{18}$ alkyl;
$R^2$ represents H or $C_1$-$C_8$ alkyl; and $R^3$ represents $C_1$-$C_{12}$ alkyl, $C_2$-$C_{12}$ alkenyl or $C_5$-$C_6$ cycloalkyl and
Z, independently of one another, represents an unsubstituted phenyl or diphenyl or a phenyl or diphenyl singly or multiply substituted with $C_1$-$C_6$ alkyl, and the third layer (C) comprises a UV-stablized polycarbonate and the fourth layer (D) comprises polycarbonate which may be UV-stabilized.

2. The multilayer product according to claim 1, wherein layer (A) has an extinction of at least 0.3 at 340 nm.

3. The multilayer product according to claim 1, wherein layer (A) is based on sol-gel coating compositions and has an extinction of between 0.2 and 4 at 340 nm.

4. The multilayer product according to claim 1, wherein layer (B) has an extinction of from 1 to 10 at 340 nm.

5. The multilayer product according to claim 1, wherein the UV absorber is at least one compound selected from the group consisting of 4,6-dibenzoyl-2-(3-trialkoxysilylalklyl)resorcinol and 4,6-dibenzoyl-2-(3-triethoxysilylpropyl)resorcinol.

6. The multilayer product according to claim 1, wherein, in Formula (II):
X represents $OR^1$,
$R^1$ represents $CH_2CH(CH_2CH_3)C_4H_9$ and
Z represents diphenyl.

7. The multilayer product according to claim 1, further comprising at least one additional layer selected from (E) and (F) or a layer (G), wherein (E) is a further UV protection layer based on alkyl acrylate and comprises a UV stabiliser, (F) is a scratch protection layer and (G) is a UV-stabilised scratch protection layer.

8. The multilayer product according to claim 7, wherein layer (E) comprises a UV absorber of Formula (II):

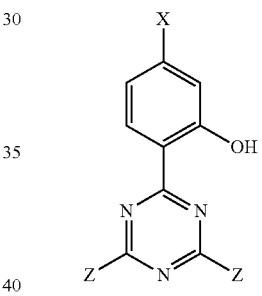

wherein
X represents $OCH(R^2)COOR^3$,
$R^2$ represents $CH_3$,
$R^3$ represents $C_8H_{17}$ and
Z represents diphenyl.

9. A method for manufacturing the multilayer product according to claim 1, comprising providing the second and third layers (B and C) in the form of a coextruded film, two laminated films or a polycarbonate film coated with the layer (B), and back injection moulding the second and third layers, and contacting the second and third layers with layer (A).

* * * * *

UNITED STATES PATENT AND TRADEMARK OFFICE
CERTIFICATE OF CORRECTION

PATENT NO.         : 8,697,227 B2                                              Page 1 of 1
APPLICATION NO.    : 13/319582
DATED              : April 15, 2014
INVENTOR(S)        : Meyer Zu Berstenhorst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this

Twenty-ninth Day of September, 2015

Michelle K. Lee
*Director of the United States Patent and Trademark Office*